May 9, 1950

F. H. BOGART 2,507,241

MACHINE TOOL

Filed Oct. 9, 1944

INVENTOR.
FRED H. BOGART
BY
Kwis Hudson Boughton & Williams
ATTORNEYS

May 9, 1950 F. H. BOGART 2,507,241
MACHINE TOOL
Filed Oct. 9, 1944 6 Sheets-Sheet 2

INVENTOR.
FRED H. BOGART
BY
Kwis Hudson Boughton & Williams
ATTORNEYS

May 9, 1950 F. H. BOGART 2,507,241
MACHINE TOOL
Filed Oct. 9, 1944 6 Sheets-Sheet 5

INVENTOR.
FRED H. BOGART
BY
Kris Hudson Boughton & Williams
ATTORNEYS

May 9, 1950 F. H. BOGART 2,507,241
MACHINE TOOL
Filed Oct. 9, 1944 6 Sheets-Sheet 6

INVENTOR.
FRED H. BOGART
BY
Kwis Hudson Boughton & Williams
ATTORNEYS

Patented May 9, 1950

2,507,241

UNITED STATES PATENT OFFICE 2,507,241

MACHINE TOOL

Fred H. Bogart, South Euclid, Ohio, assignor to The Warner & Swasey Company, Cleveland, Ohio, a corporation of Ohio Application October 9, 1944, Serial No. 557,810

18 Claims. (Cl. 279—1)

This invention relates to a machine tool and more particularly to means for operating the chuck closing and opening mechanism of a machine tool.

Heretofore machine tools have had the mechanism for opening and closing a chuck operated entirely manually or entirely by power driven means. In the manual operation of the chuck opening and closing mechanism of a machine tool frequently a considerable degree of force is required to operate such mechanism to effect adequate closing of the chuck jaws to properly grip the element held by the chuck. It may be difficult, particularly in machine tools of the larger sizes, for the operator of the machine tool to manually apply the necessary force to efficiently operate the chuck closing and opening mechanism.

An object of the present invention is to provide in the manually operated chuck actuating mechanism of a machine tool, power means for supplementing the manual force applied to such mechanism by the operator in actuating the same.

Another object is to provide an arrangement such as specified in the last mentioned object and wherein the power means becomes effective automatically to supplement the manual force applied to the chuck actuating mechanism, wherefore the operator operates such mechanism in the usual manner by manually moving the operating member.

A further object is to provide an arrangement such as specified in the above mentioned objects and wherein the power means supplements the manual force applied to the chuck actuating mechanism both in closing and in opening the chuck.

A still further object is to provide in the manually operated chuck actuating mechanism of a machine tool, power means for supplementing the manual force applied to such mechanism, together with means for automatically rendering the said power means ineffective when the chuck is fully closed.

Another object is to provide in the manually operated chuck actuating mechanism of a machine tool, power means for supplementing the manual force applied to such mechanism in opening and closing the chuck, together with means for automatically rendering the power means ineffective when the chuck has been opened or has been closed.

A further object is to provide in the manually operated chuck actuating mechanism of a machine tool, an electric motor driven power means for supplementing the manual force applied to such mechanism by the operator.

Another object is to provide in the manually operated chuck actuating mechanism of a machine tool, an electric motor driven power means for supplementing the manual force applied to such mechanism by the operator in opening and closing the chuck and wherein said electric motor is started and stopped and its direction of operation reversed automatically at the proper moments in the manual operation of said chuck actuating mechanism.

A further object is to provide in a manually operated chuck actuating mechanism of a machine tool, an electric motor driven power means for supplementing the manual force applied to such mechanism by the operator and which power means can be rendered inactive when it is desired to operate said mechanism solely by manual force.

Another object is to provide means for increasing the efficiency and for facilitating the operation of a manually operated chuck actuating mechanism of a machine tool and which means is simple in design and construction and is efficient in operation.

Further and additional objects and advantages not hereinbefore specified will become apparent during the detailed description of several embodiments of the invention which is to follow.

Although the invention may be embodied in the manually operated actuating mechanism of different types of chucks used in various kinds of machine tools, it will be described herein as embodied in the manually operated actuating mechanism of a collet chuck mounted in a rotating spindle of a machine tool although it should be understood that the use of the invention is not limited to this type of chuck.

Referring to the accompanying drawings illustrating several embodiments of the invention.

Figure 1:
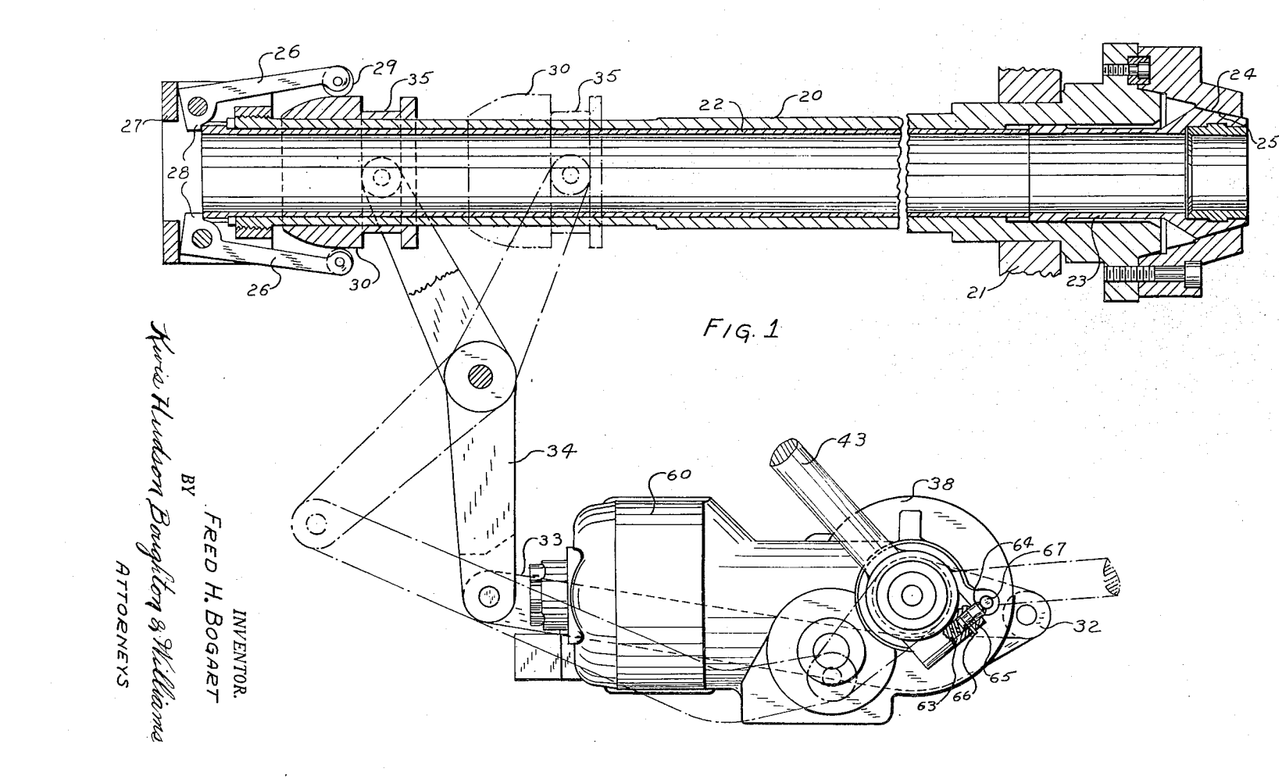
Fig. 1 is a somewhat diagrammatic view showing in section a portion of a work spindle of a machine tool, such as a lathe, and having a collet chuck mounted therein, with certain parts of the chuck actuating mechanism shown in section while other parts thereof are shown in front elevation; the full line illustration of the relationship of the parts of the actuating mechanism being the position they occupy when the collet chuck is closed and is gripping the stock, while the dash and dot line illustration of such parts shows the position they occupy when the collet chuck is open and stock is free to be fed therethrough.
Figure 2:
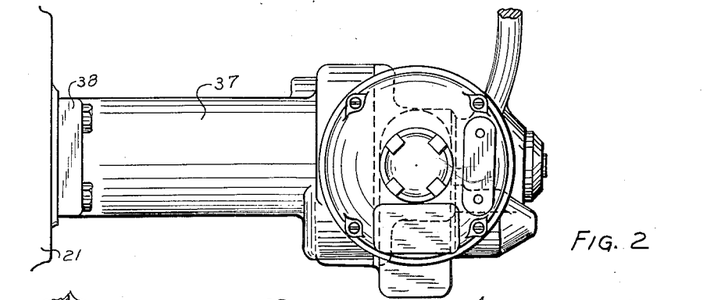
Fig. 2 is an elevational view of the housing of the chuck actuating mechanism and the electric motor, and is taken looking from the left hand side of Fig. 1.

As previously stated, the invention may be embodied in the manually operated actuating mechanism of various forms of chucks used in different types of machine tools and the application of the invention as shown in Fig. 1 to the manually operated actuating mechanism of a collet chuck is merely by way of illustration and not by way of limitation. Also by way of illustration, the collet chuck is shown as mounted in the rotatable work spindle 20 of a lathe and which spindle is supported in the headstock of the lathe as will be well understood in the art, a portion of which headstock and the bed by which it is carried being indicated in Fig. 1 at 21 and conjointly termed a support. The spindle 20 houses an endwise movable collet operating sleeve 22 which when moved in one direction shifts the collet 23 to cause the cooperating inclined surfaces 24 and 25 to move the spring jaws of the collet into gripping relation with the stock (not shown) as will be well understood in the art. When the pressure on the collet operating sleeve 22 is released, the spring jaws of the collet cause the collet to shift in the opposite direction with a resulting opening of the collet jaws and an endwise movement of the sleeve 22 in said opposite direction, as will be well understood in the art.

The collet operating sleeve 22 is moved in its chuck closing direction by means of fingers 26 pivoted in a supporting element 27 secured to the spindle 20. The fingers 26 have heel portions 28 which engage the left hand end of the sleeve 22 and said fingers are provided also with rollers 29, which cooperate with a collet actuating wedge member 30 that is slidable axially of the spindle 20 and has a conical or camming portion. When the wedge member 30 is in the position shown by dot and dash lines in Fig. 1 the collet jaws are open and the stock may be fed through the spindle by any suitable means, not disclosed but well understood in the art. When the member 30 is in the full line position of Fig. 1 the collet jaws are closed and the collet is tightly gripping the stock and machining operations can be performed on the latter. It will be seen that as the wedge member 30 moves from the dot and dash position of Fig. 1 toward its full line position therein, the conical surface of the member contacts the rollers 29 and spreads the fingers 26 apart to cause the heel portions 28 thereof to shift the sleeve 22 toward the right, as viewed in the drawing, to effect closure of the collet jaws. The contour of the conical surface of the wedge member 30 is so designed as to provide the proper leverage for producing the closing movement of the collet jaws, it being noted that the member 30 is provided with a cylindrical portion on which the rollers 29 rest when the collet jaws are fully closed. The feeding of the stock when the collet jaws are released takes place as the wedge member 30 is moving from the dash-dot position of Fig. 1 toward the left and to a position where the rollers 29 first contact the conical surface of the wedge member. The construction just described is well known in the art and need not be explained in greater detail.

Figure 3:
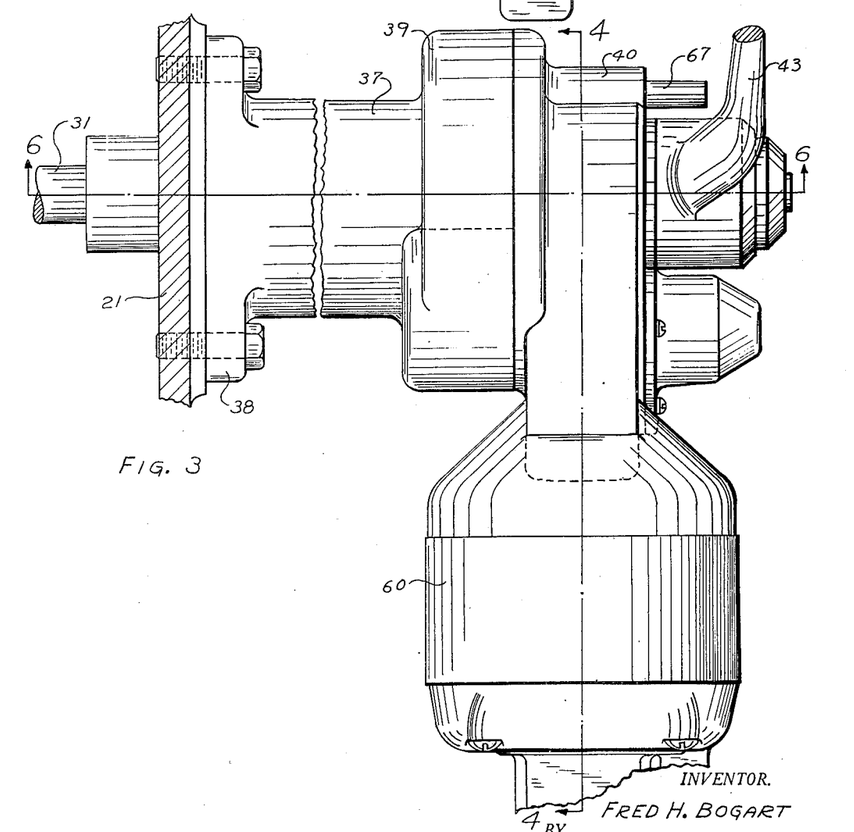
Fig. 3 is a top plan view of the housing and motor shown in Fig. 2 and is taken on a larger scale.

The wedge member 30 is shifted axially of the spindle 20 to effect opening and closing of the collet by the rocking movement of a shaft 31 and which shaft is suitably supported below the headstock in the bed and projects horizontally from the front side of the bed, as will be well understood (see Figs. 3 and 6). The rocking movements of the shaft 31 may be transmitted to the wedge member 30 to impart axial shifting movement thereto by various forms of mechanisms well known in the art.

Figure 6:
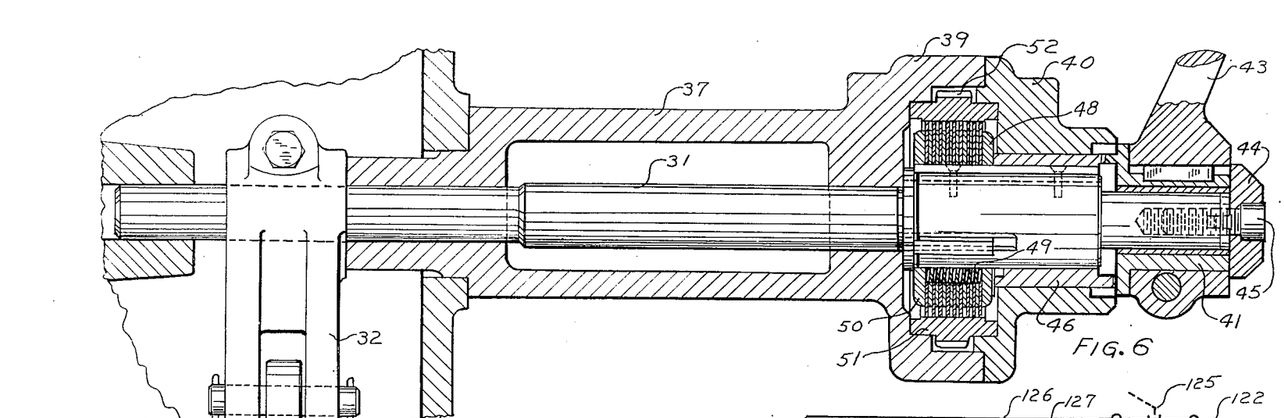
Fig. 6 is a longitudinal sectional view taken substantially on line 6—6 of Fig. 3, looking in the direction of the arrows.
Figure 7:
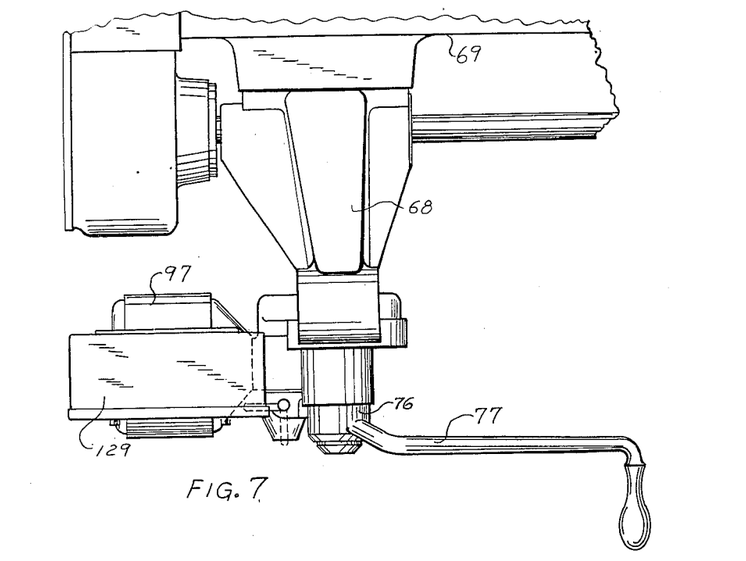
Fig. 7 is a top plan view of a modified form of chuck actuating mechanism embodying the invention.
Figure 8:
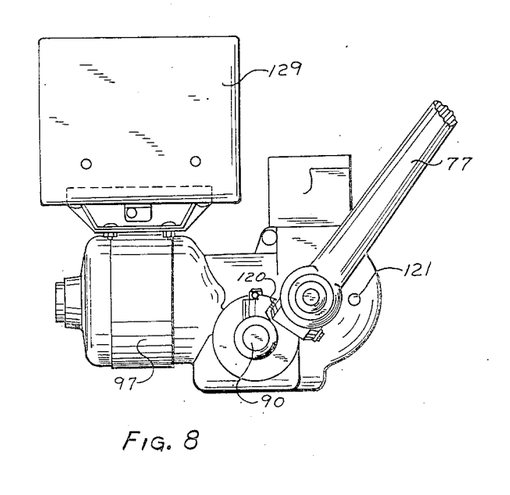
Fig. 8 is an end elevational view of the chuck actuating mechanism shown in Fig. 7.
Figure 9:
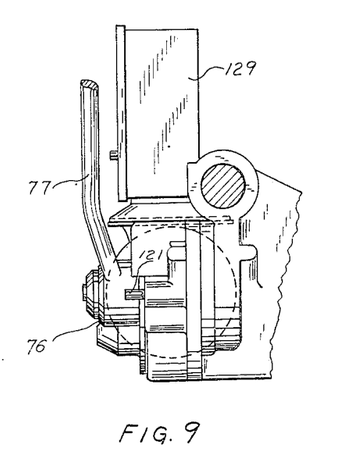
Fig. 9 is a side elevational view of the chuck actuating mechanism shown in Figs. 7 and 8.

In Figs. 1 and 6 the shaft 31 is shown as operatively connected to the wedge member 30 by means of a short double lever arm 32 fixed at one of its ends to the shaft 31 within the bed of the machine and having its free end straddling and pivotally connected to the angular end of a link 33. The opposite end of the link 33 is pivotally connected to one end of a lever 34 that is pivotally supported intermediate its ends on a supporting bracket carried by the headstock. The lever 34 at its upper end is provided with a fork which straddles the wedge member 30 and has rollers engaging in the annular groove 35 formed in said wedge member.

The shaft 31 is rockably supported in suitable bearings within the bed of the machine and, as previously stated, said shaft projects outwardly of the front side of the bed and extends into a housing 37 rigidly secured to the front side of the bed in any suitable manner, as for instance by means of a flange 38, bolted or otherwise attached to the bed.

The shaft 31 projects through an enlarged portion 39 of the housing and into and through a cap 40 secured to the enlarged portion 39 by suitable means, such as screws or other securing elements. The shaft 31 outwardly of the cap 40 has mounted on its reduced end a flanged sleeve 41 (see Fig. 6) and the flange of said sleeve is provided with clutch teeth 42 (see Fig. 5) said clutch teeth having inclined surfaces 42a and straight surfaces 42b extending axially of the sleeve and shaft for a purpose later to be explained.

The flange of the sleeve 41 is disposed intermediate the end of the cap 40 and the hub of a manually operated handle 43, which hub is mounted on and keyed to the sleeve 41. A clamping collar 44 is secured to the shaft 31 by a cap screw 45, and when said cap screw is screwed tightly into position, said screw and the collar 44 act to clamp the handle hub and sleeve operatively together, so that the same rock as a unit relative to the shaft 31.

Figure 4:
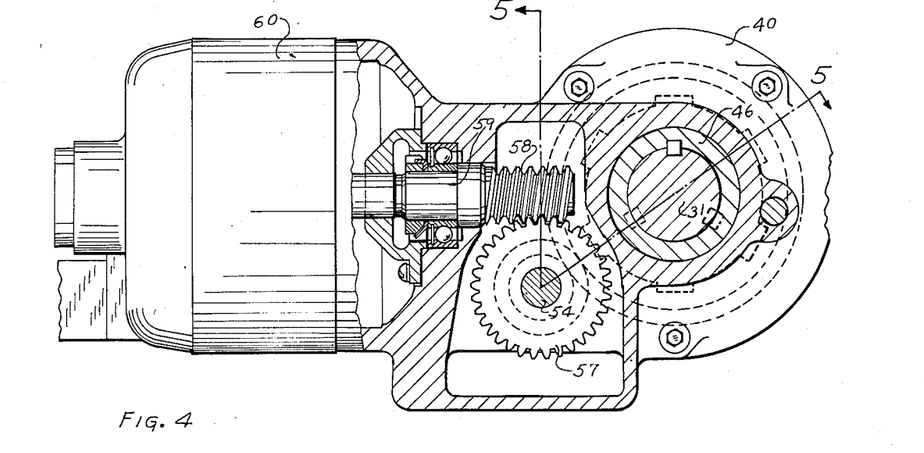
Fig. 4 is a sectional view taken approximately on line 4—4 of Fig. 3, looking in the direction of the arrows.

Within the cap 40 a clutch sleeve member 46 is splined to the shaft 31 to have axial movement thereon and rotate therewith, and said clutch sleeve member is provided on its outer or right hand end (as viewed in Fig. 6) with clutch teeth 47 which have inclined surfaces 47a and straight surfaces 47b that extend axially of the sleeve and shaft. It will be seen that when the handle 43 and sleeve 41 are rocked in an anticlockwise direction, as viewed in the drawings, the inclined surfaces 42a of the clutch teeth 42 will engage the inclined surfaces 47a of the clutch teeth 47 and will cam the clutch sleeve member 46 axially of the shaft and toward the left, as viewed in Fig. 6. It will further be seen that when the handle 43 and sleeve 41 are rocked in a clockwise direction, as viewed in the drawing, the straight surfaces 42b of the clutch teeth 42 will contact the straight surfaces 47b of the clutch teeth 47 and thus a positive driving action is established between the sleeve 41 and the sleeve 46, with the result that said clockwise rotation of the handle 43 rotates the shaft 31 positively in a clockwise direction. The inner end of the sleeve member 46 is in contact with a movable collar 48 of a friction clutch and said collar is mounted on the shaft 31 within the enlarged portion 39 of the housing. A coil spring or springs 49 act on the collar 48 to maintain the same in engagement wtih the end of the sleeve 46, said spring or springs being interposed between the collar 48 and the flange of a clutch member 50 that is keyed to the shaft 31. The member 50 carries a plurality of clutch disks splined to the member, and said clutch disks cooperate with a plurality of similar clutch disks splined to the interior of an outer clutch member 51, wherefore when the collar 48 is moved toward the flange of the clutch member 50 the disks carried by the member 50 and the member 51 will be brought into frictional driving engagement with each other, as is well understood in the art. When pressure on the collar 48 is relieved, the spring or springs 49 act to separate the collar 48 from the flange of the clutch member 50 to relieve the engagement of the clutch disks, wherefore the disks carried by the member 50 can rotate relative to the disks carried by the clutch member 51 and the clutch is inactive. The clutch member 51 is rotatably supported within the enlarged portion 39 of the housing and within the cap 40, and is provided midway of its opposite ends and on its periphery with a ring gear 52. The ring gear 52 meshes with a pinion 53 fixed on a shaft 54 that is rotatably mounted in suitable bearings formed in the housing, and said shaft extends parallel to the shaft 31 and to the left of and below said shaft, as viewed in Fig. 4.

Figure 5:
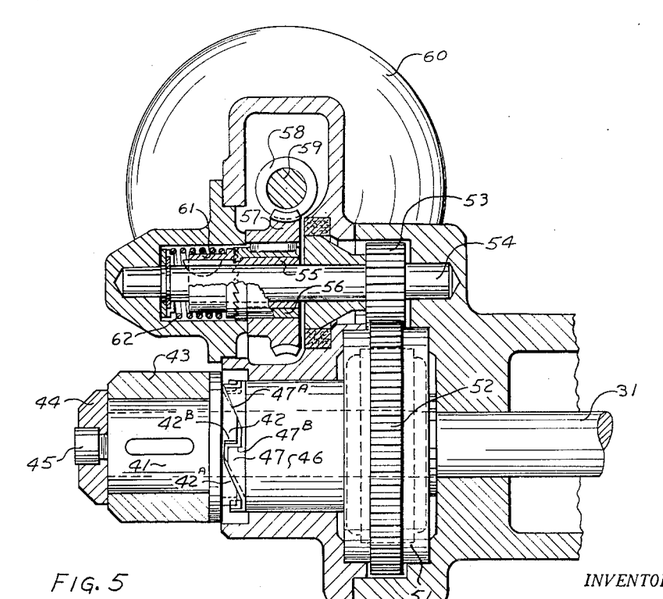
Fig. 5 is a developed sectional view taken along irregular line 5—5 of Fig. 4, looking in the direction of the arrows.

The shaft 54 has a bushing 55 mounted thereon, and on this bushing a clutch sleeve member 56 is freely rotatable and said clutch sleeve member is provided at one end, i. e., the left hand end, as viewed in Fig. 5, with ratchet clutch teeth. A worm gear 57 is keyed to the clutch sleeve member 56, and said worm gear meshes with a worm 58 formed on or attached to the end of a motor spindle 59 that extends transversely of and at a right angle to the shafts 31 and 54. The worm 58, although shown as directly formed on the motor spindle 59, could be made separate from said spindle and attached thereto. The motor spindle 59 is suitably supported in bearings formed in a laterally extending portion of the housing 37, and said spindle carries the rotor of an electric motor 60, as will be well understood.

This electric motor preferably is of the non-reversing constant speed type and during the operation of the machine tool said motor may be operated continuously. The motor 60 may be controlled by a suitable switch (not shown) mounted on a convenient part of the machine tool.

A clutch sleeve member 61 is splined on the shaft 54 and is provided with ratchet clutch teeth that are held by means of a coil spring 62 normally in engagement with the ratchet clutch teeth on the clutch sleeve member 56. It will be seen that the motor 60 drives the shaft 54 through the worm 58, worm gear 57, clutch sleeve member 56 and clutch sleeve member 61. It will also be seen that the gear 52 and the clutch member 51 will be driven by the motor in one direction through the pinion 53 that is fixed on the shaft 54. It will further be seen that the ratchet teeth on the clutch sleeve members 56 and 61 provide a safety feature preventing overloading of the motor or any tendency to turn the motor in the reverse direction.

Referring to Fig. 1 it will be seen that the hub of the handle 43 is provided with a recess extending transversely of the shaft 31 and said recess houses a coil spring 63 which acts on the inner end of a plunger 64 that has sliding movement in the recess within predetermined limits defined by an annular groove 65 formed in the plunger and a pin 66 carried by the handle hub and projecting into said annular groove. When the handle 43 is in the position it occupies when the chuck is fully closed (the full line position of Fig. 1) the outer end of said plunger has contacted a stop pin 67 carried by the cap 40 and has been depressed into the recess against the action of the spring 63. Therefore, as soon as the operator releases his pressure on the handle 43 the spring 63, acting against the plunger 64 which is contacting the stop pin 67, rocks the handle 43 slightly in a clockwise direction but sufficiently far to allow the clutch sleeve member 46 and the collar 48 to shift to the right, as viewed in Fig. 6, under the action of the spring or springs 49 to relieve the pressure on the clutch disks carried by the clutch members 50 and 51, so that said disks are not frictionally contacting and do not scrape or grind against each other during the time that the chuck is closed, it being recalled that the electric motor 60 runs continuously during the operation of the machine tool.

In order to clearly explain the construction of the embodiment of the invention illustrated in Figs. 1 to 6 inclusive, the manner in which said construction operates will now be explained. Assuming that the parts are in the position indicated by dot and dash lines in Fig. 1, i. e., the chuck open position, and that the motor 60 is operating, it will be understood that said motor is not operatively connected at this time to the shaft 31 since the relationship of the clutch teeth 42 and 47 is such that the clutch member 46 has shifted outwardly to effect a non-driving disengagement of the clutch disks carried by the clutch members 50 and 51. Assuming that the operator now wishes to close the chuck, he manually swings the handle 43 in an anticlockwise direction from the dot and dash line position of Fig. 1 toward the full line position thereof. This movement of the handle 43 causes the clutch sleeve 41 to rock in an anticlockwise direction, whereupon the inclined surfaces 42a of the clutch teeth 42 contact the inclined surfaces 47a of the clutch teeth 47 and tend to rotate the clutch sleeve member 43 and the shaft 31 to which said member is splined in an anticlockwise direction, with a resultant movement of the short lever arm 32, link 33 and lever arm 34 from the dot and dash line position of Fig. 1 toward the full line position thereof. This results in a shifting movement being imparted to the wedge member 30 from the dot and dash line position toward the left as viewed in Fig. 1. The engagement of the inclined surfaces 42a and 47a of the clutch teeth 42 and 47 also cams the clutch sleeve member 46 axially of the shaft 31 toward the left, as viewed in Fig. 6 and into pressing engagement with the collar 48 to move the latter against the action of the spring or springs 49 and cause the clutch disks carried by the clutch members 50 and 51 to drivingly engage. This driving engagement of the clutch disks takes place approximately at the time the conical surface of the wedge member 30 engages the rollers 29 to commence spreading the fingers 26 and initiate the axial shifting toward the right of the sleeve 22 to shift the collet chuck and cause its jaws to move into stock gripping position. As soon as the clutch disks carried by the clutch members 50 and 51 are thus drivingly engaged, the torque of the electric motor 60 is impressed on the shaft 31, in addition to the torque applied thereto through the manual movement of the handle 43 in the anticlockwise direction. Consequently, the chuck is now being closed by both manual and power force, and the operator continues the anticlockwise movement of the handle 43 until the chuck is fully closed, and at such time the handle 43 will be in the full line position of Fig. 1, with the plunger 64 engaging the stop pin 67 and compressed against the spring 63. The operator now releases the handle 43 and the latter moves slightly in the clockwise direction due to the action of the spring pressed plunger 64 against the stop pin 67. This slight clockwise movement of the handle 43 rotates the clutch sleeve member 41 slightly in a clockwise direction and relieves the pressure of the inclined surfaces 42a of the clutch teeth 42 on the inclined surfaces 47a of the clutch teeth 47, whereupon the clutch springs 49 act to move the collar 48 and the clutch sleeve member 46 slightly toward the right, as viewed in Fig. 6, and such movement is sufficient to disengage the clutch disks carried by the clutch members 50 and 51 and prevent the same from grinding together during the time the clutch remains closed, it being remembered that the motor 60 is continuously operating.

When the operator desires to open the clutch he manually swings the handle 43 in a clockwise direction from the full line position of Fig. 1 to the dot and dash line position thereof. This manual movement of the handle 43 in the clockwise direction causes the clutch sleeve member 41 to rock in a clockwise direction and brings the straight surfaces 42b of the clutch teeth 42 into contact with the straight surfaces 47b of the clutch teeth 47 and thus the clutch sleeve member 46 is driven positively in the clockwise direction, with a resulting clockwise movement of the shaft 31. During this time the clutch disks of the clutch members 50 and 51 are drivingly disengaged so that the clockwise rotation of the shaft 31 and clutch sleeve member 46 is not transmitted back to the motor 60. However, should such movement be transmitted back through the shaft 54 for some reason, the ratchet teeth on the clutch members 56 and 61 will prevent the movement from being transmitted to the motor. As the shaft 31 rotates in the clockwise direction, the lever arm 32, link 33 and lever 34 move from their full line position of Fig. 1 to their dot and dash line position thereof, and effect an axial shifting movement of the wedge member 30 from the full line position to the dot and dash line position, thus relieving the pressure on the fingers 26 and the sleeve 22, whereupon the inherent spring action of the jaws of the collet chuck causes the collet to shift toward the left and said jaws to open and release their grip on the stock. When the chuck has been fully opened the operator releases the handle 43 and the motor continues to operate but, however, no movement is imparted to the shaft 31 since the clutch disks of the clutch members 50 and 51 are drivingly disengaged.

It will be seen that in the embodiment of the invention already described a power force functions atuomatically upon the manual operation of the handle in a chuck closing direction to supplement the manual force applied to the chuck actuating mechanism, but, on the other hand, when said handle is manually moved in a chuck opening direction, the power force is ineffective and the chuck actuating mechanism is operated solely manually.

In Figs. 7 to 14 inclusive there is disclosed a modified embodiment of the invention which differs from the first described form in that the manual force is supplemented by a power force in operating the chuck actuating mechanism in both the chuck closing and chuck opening directions. Also the second embodiment now to be described differs from the first form in that the electric motor does not run continuously in the same direction but its operation is started near the beginning of the chuck closing movement and the beginning of the chuck opening movement and is stopped automatically at the end of said movements. Also the direction of operation of the motor is reversed automatically for the chuck opening movement and the chuck closing movement. The chuck actuating mechanism of this modified form of construction may be used either with a push-out or draw-back collet chuck or with some other form of chuck, particularly any form of chuck which requires considerable force to operate the actuating mechanism in the chuck opening direction.

The embodiment of the invention now about to be described may be employed advantageously where substantial force is required to open the chuck, as, for instance, in large size machine tools where the friction and inertia of the chuck parts take substantial force to cause the chuck jaws to release their grip on the stock.

The embodiment shown in Figs. 7 to 14 inclusive comprises a housing 68 which projects from the front of the bed 69 and is rigidly attached to said bed by suitable means such as a flange bolted or otherwise secured to the bed. The housing 68 rotatably supports the rockable shaft 70 which extends into the bed and is connected to the chuck actuating mechanism within the bed by any suitable operative connections as, for instance, the operative connections disclosed in Fig. 1 hereof. The shaft 70 extends into an enlarged portion 68a of the housing and then into and through a cap 71 secured to said enlarged portion. The end of the shaft 70 which projects outwardly of the cap 71 is provided with a bushing 72 on which the sleeve 73 rotates. This sleeve 73 is provided at its inner end with a flange 74 that has formed thereon double acting cam clutch teeth 75 (see Fig. 11). The hub 76 of the manually operated handle 77 is keyed to the sleeve 73 and said sleeve and hub are held in assembled position on the extended end of the shaft 70 by a collar 78 and a cap screw 79 that passes through said collar and screws into a recess in the shaft 70 (see Fig. 10). The hub 76 of the handle is spaced outwardly of the flange 74 of the sleeve 73 and the bottom 80 of an inwardly facing cup-shaped member located between the inner end of the hub and said flange 74, said bottom being provided with a central opening through which the sleeve 73 extends with said sleeve forming the support for the cup-shaped member. The periphery of the cup-shaped member rotatably interfits a counterbore in the cap 71 and surrounds the flange 74 of the sleeve 73 and the clutch teeth formed thereon.

The hub 76 of the handle 77 is provided adjacent its inner side with a plurality of spring-pressed plungers 81 which engage the bottom 80 of the cup-shaped member and form a friction driving connection between said member and the hub 76, wherefore when the handle 77 and the hub 76 are rocked the cup-shaped member will also rock with the hub and within predetermined limits, as will be hereinafter explained.

A sleeve 82 is splined on the shaft 70 within the cap 71 and the outer end of said sleeve is provided with double acting cam clutch teeth 83 that cooperate with the clutch teeth 75 on the flange 74 of the sleeve 73 as will be hereinafter explained. The inner end of the sleeve 82 engages a collar 84 which is mounted on the shaft 70 and is held in contact with the sleeve 82 by one or more clutch springs 85 forming part of a friction clutch mechanism of substantially conventional form. The springs 85 engage a clutch member 86 keyed to the shaft 70 and said clutch member has splined thereto a plurality of friction clutch disks which cooperate with similar friction clutch disks splined to a second clutch member 87. The friction clutch is located in a suitable chamber formed by adjacent recesses in the enlarged portion 68a of the housing and in the cap 71, with the clutch member 87 rotatably supported by said portion 68a and said cap. The clutch member 87 is provided on its periphery with a gear 88 that meshes with a pinion 89 fixed to a shaft 90 that is rotatably supported in suitable bearings in the housing and cap member. The shaft 90 extends parallel to the shaft 70 and is located to the left and below said shaft 70, as clearly indicated in Fig. 12.

Figure 10:
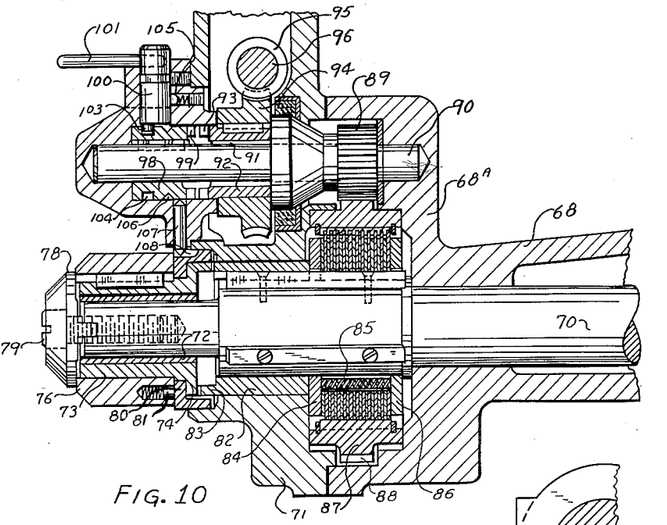
Fig. 10 is a developed sectional view of a portion of the chuck actuating mechanism shown in Figs. 7, 8 and 9 and particularly of the power drive thereof and said developed section is taken approximately along irregular line 10—10 of Fig. 12, looking in the direction of the arrows.
Figure 11:
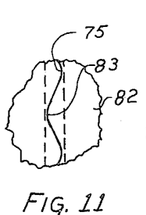
Fig. 11 is a fragmentary developed view of the double acting cam clutch shown in Fig. 10.

The shaft 90 is provided with a bushing 91 on which freely rotates a sleeve 92 and the left hand end of which sleeve, as viewed in Fig. 10, is provided with positive clutch teeth 93. The hub of a worm gear 94 is keyed to the sleeve 92 and said hub is held against axial displacement relative to the shaft 90 and therefore said sleeve cannot move axially of said shaft. The worm gear 94 meshes with a worm 95 which is mounted on or formed in the spindle 96 of an electric motor 97 with said spindle extending perpendicularly to the shafts 90 and 70. The motor 97 is supported from the housing 68 and said motor is preferably of the three-phase reversible type.

A sleeve 98 is splined on the shaft 90 (see Fig. 10) and on its inner end is provided with positive clutch teeth 99 adapted to engage with the clutch teeth 93 and operatively interconnect the sleeves 92 and 98, wherefore when said clutch teeth are engaged the motor 97 acts to drive the shaft 90, pinion 89, gear 88 and clutch member 87. The sleeve 98 can be shifted from a position wherein the clutch teeth 99 and 93 are disengaged (as shown in Fig. 10) to a position wherein said clutch teeth are engaged by means now to be described.

Figure 12:
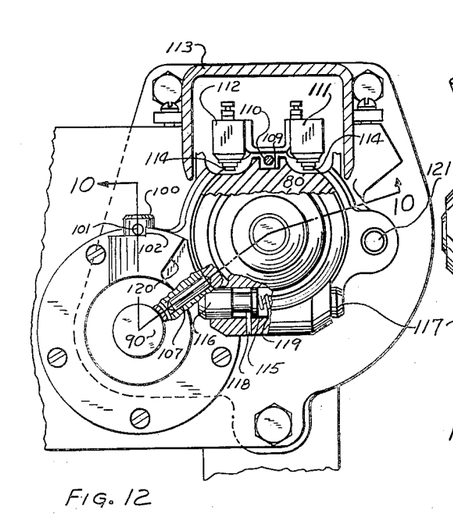
Fig. 12 is a view, partly in end elevation and partly in section, of the chuck actuating mechanism shown in Figs. 7 to 11 inclusive.
Figure 13:
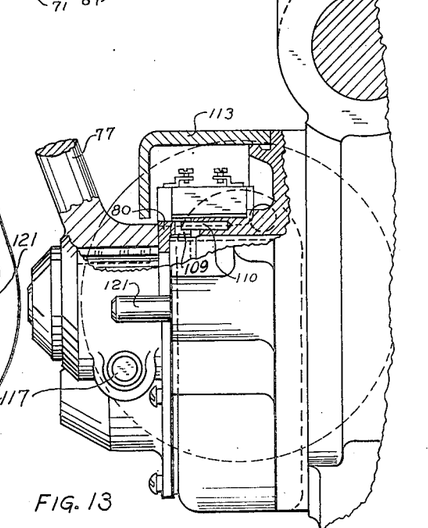
Fig. 13 is a side elevational view of a portion of said chuck actuating mechanism with certain parts thereof broken away and shown in section.

A rockable shaft 100 is mounted in a suitable bore in the housing and extends vertically outwardly of the housing. An operating handle 101 is secured to the upper end of the shaft 100, and when the clutch teeth are disengaged said handle will be in contact with the shoulder 102 formed on the housing, as shown in Fig. 12. The lower end of the shaft 100 is provided with an eccentric pin 103 that extends into an annular peripheral groove 104 formed in the sleeve 98. It will be seen that when the handle 101 is rocked from the position shown in Figs. 10 and 12 toward the left, said shaft 100 will be rocked and the eccentric pin 103 will act to shift the sleeve 98 to interengage the clutch teeth 99 and 93 so that the motor 97 will be driving the shaft 90.

The shaft 100 is held against axial displacement by means of an adjustable stop screw engaging in an annular groove in the shaft, as clearly shown in Fig. 10. The shaft 100 is held in either clutch engaged position or clutch disengaged position by means of a spring point 105 carried by the housing and engaging in circularly spaced recesses formed in the circumference of the shaft 100 as will be well understood.

Inwardly of the annular groove 104 the sleeve 98 is provided with an annular V-shaped groove 106 and into which one pointed end of a sliding pin 107 may extend when the clutch teeth 93 and 99 are interengaged. It will be noted that the pin 107 slides approximately at an angle of 45° from the vertical, it being understood that Fig. 10 is a developed view and that gravity acts on the pin 107 when it is sliding into engagement with the annular recess 106 of the sleeve 98. The opposite pointed end of the pin 107 cooperates with a V-shaped recess 108 formed in the periphery of the cup-shaped member 80. It will be seen that when the sleeve 98 is in the position shown in Fig. 10 with the clutch teeth 99 and 93 disengaged, the pointed end of said pin 107 has been cammed out of the annular V-shaped recess 106 and is engaging the periphery of the sleeve 98, while the other pointed end of said pin has been positioned in the V-shaped recess 108 of the cup-shaped member 80 and acts to lock said member against rotation.

The cup-shaped member 80 is provided in its upper side with a squared recess 109 and a pin 110 carried by the housing projects into said recess and acts by engaging the side walls thereof to limit the rocking movement of the member 80 with the handle hub 76 in opposite directions.

The housing supports a pair of suitable switches 111 and 112 and said switches preferably are of the well known microswitch type, with the switch 111 acting to energize the motor 97 for the chuck closing operation and the switch 112 acting similarly for the chuck opening operation. The switches are enclosed in a suitable cover 113 secured to the housing. The actuating plungers 114 of the switches are located in recesses formed in the member 80 on opposite sides of the recess 109 and the size of said recesses and the shape of the bottom walls thereof are such that when the member 80 rocks in either direction within the limits afforded by the pin 110 the actuating plunger 114 of one or the other switch will be depressed by its engagement with the bottom wall of one or the other of the recesses depending upon the direction of movement of the member 80 and will close its respective micro-switch. The purpose of this arrangement will be clearly explained in describing a complete cycle of operation of the construction.

The hub 76 of the handle 77 is provided with a bore 115 extending therethrough and in which bore plungers 116 and 117 are mounted to project from the opposite ends thereof. These plungers are alike and are provided with annular elongated recesses into which extend pins 118 that limit the inward and outward movements of the plungers. The plungers are normally held in their outermost positions by means of a coil spring 119 (see Fig. 12), mounted between the inner ends of the plungers.

When the handle 77 is in the position it occupies when the chuck is fully opened, the plunger 116 has been brought into engagement with the shoulder 120 (see Fig. 12) formed exteriorly of the housing and has been compressed against the action of the spring 119. Consequently when the operator releases his grasp on the handle 77 the spring 119 and the plunger 116 acting against the shoulder 120 rock the lever 77 slightly in a clockwise direction and just far enough to disengage the bottom of the respective recess of the member 80 from the actuating plunger 114 of the switch 112 and allow said switch to open, thus deenergizing the motor. Similarly, when the handle has been rocked from the clutch open position of Fig. 8 in an anti-clockwise direction to chuck fully closed position, the plunger 117 engages and is depressed against the spring 119 by the pin 121 projecting outwardly of the housing, see Figs. 8, 9, 12 and 13. Therefore when the operator releases his grasp on the handle 77 the plunger 117 and spring 119, acting against the pin 121, will rock the handle 77 slightly in a clockwise direction and sufficiently far to disengage the bottom of the respective recess in the member 80 from the actuating plunger 114 of the switch 111 to allow said switch to open and the motor 97 to be deenergized.

Figure 14:
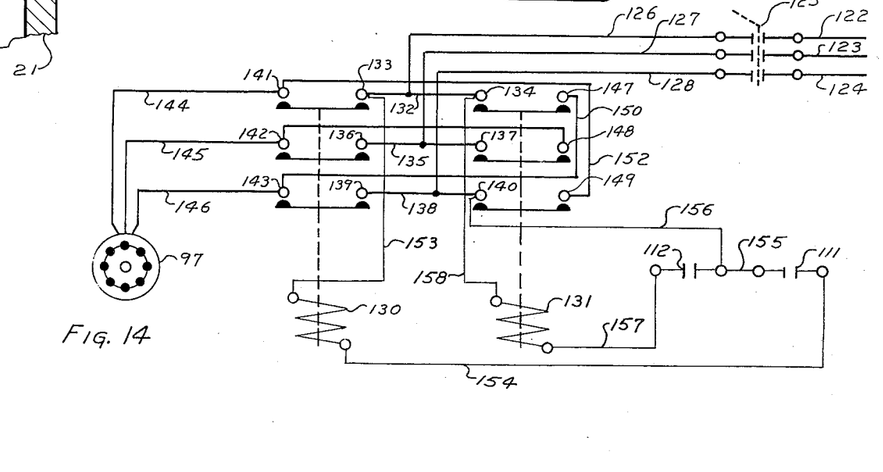
Fig. 14, Sheet 4, is a wiring diagram of the power and control circuits for the electric motor of the form shown in Figs. 7 to 13 inclusive.

Fig. 14 is a diagram of the power circuit to the motor 97 and of the control circuit therefor and in which latter circuit the switches 111 and 112 are located. The leads 122, 123 and 124 from a suitable source of supply of three-phase electrical energy are connected to the main connect and disconnect switch 125 which may be located in any suitable and desirable place. The leads 126, 127 and 128 extend from the switch 125 into a motor controller 129 mounted on top of the motor 97. If desired, the main connect and disconnect switch 125 might also be contained in the motor controller 129.

The motor controller 129 contains forward and reverse motor control contactor switches, the contacts of which are operated by solenoids 130 and 131 with the energization and deenergization of said solenoids controlled by the switches 111 and 112 respectively.

The lead 126 is connected to a wire 132 that is in turn connected to a contact 133 of the forward contactor switch and a contact 134 of the reverse contactor switch. The lead 127 is connected to a wire 135 which in turn is connected to the contact 136 of the forward contactor switch and the contact 137 of the reverse contactor switch. The lead 128 is connected to the wire 138 which in turn is connected to the contact 139 of the forward contactor switch and the contact 140 of the reverse contactor switch. The contacts 133, 136 and 139 of the forward contactor switch are paired, respectively, with the contacts 141, 142 and 143 of said forward contactor switch, and said latter contacts are connected to the motor 97 by the leads 144, 145 and 146 respectively.

The contacts 134, 137 and 140 of the reverse contactor switch are paired respectively with the contacts 147, 148 and 149 of said reverse contactor switch, with the contact 147 connected to the contact 143 of the forward contactor switch by wire 150, the contact 148 connected to contact 142 of the forward contactor switch by wire 151, and the contact 149 connected to the contact 141 of the forward contactor switch by the wire 152.

It will be seen that when the solenoid 130 is energized by the closing of the switch 111 and the contacts 133 and 141, 136 and 142, and 139 and 143 are interconnected, current is flowing from the leads 126, 127 and 128 to the motor 97 through the wires 144, 145 and 146, respectively, and the motor is energized for forward operation. It will be seen that when the switch 111 is open and the reverse switch 112 is closed to deenergize the solenoid 130 and energize the solenoid 131, the forward circuit to the motor 97 is interrupted and the reverse circuit thereto established, at which time the lead 126 will be connected through the switch contacts 134 and 147 with the wire 150 and the latter through the switch contact 143 with the wire 146, while the lead 128 will be connected through the switch contacts 140 and 149 with the wire 152, and the latter through the switch contact 141 with the wire 144; that is, the connection with the leads 126 and 128 with the motor 97 will be reversed while the lead 127 will be connected to the motor as in the forward operation. The solenoid 130 is connected by a wire 153 with the switch contact 133 and also by wire 154 with one of the contacts of the switch 111, the other contact of which is connected by a short wire 155 with one of the contacts of the switch 112 and said latter contact is connected by a wire 156 with the contact 140 of the reverse contactor switch. The solenoid 131 is connected by a wire 157 with the other contact of the switch 112 and is also connected by a wire 158 with the contact 134 of the reverse contactor switch.

The operation of the mechanism disclosed in Figs. 7 to 14 inclusive will now be described. It will be assumed that the main switch 125 is closed and the clutch teeth 93 and 99 are engaged, wherefore the pin 107 will have moved downwardly into the V-notch 106 of the sleeve 98 and will have disengaged itself from the V-notch 108 of the member 80, thus freeing said member for limited rocking movements with the handle. It will also be assumed that the chuck is open and the handle 77 is in the position shown in Fig. 8 with the plunger 116 extended but engaging the shoulder 120. When the operator desires to close the chuck he rocks the handle 77 in an anticlockwise direction and such movement of the handle through the friction drive between it and the member 80 provided by the spring-pressed plungers 81 causes said member 80 to rock in an anticlockwise direction with the handle until the right hand side of the recess 109 of the member 80 contacts the pin 110, at which time the actuating plunger 114 of the switch 111 is moved by its engagement with the bottom of the recess in the member 80 that is located to the right of the recess 109 as viewed in Fig. 10, with the result that the switch 111 is closed. It will be understood that the manual movement of the handle 77 in the anticlockwise direction rocks the sleeve 73 to which the handle is keyed in said direction and causes the cam clutch teeth 75 to cooperate with the cam clutch teeth 83 of the sleeve 82 to impart to said sleeve an anticlockwise movement and also an axial movement. Inasmuch as the sleeve 82 is splined to the shaft 70, the anticlockwise movement imparted to said sleeve will be transmitted to the shaft 70. However, as soon as the switch 111 is closed, the motor 97 is energized for forward operation and drives the gear 88 and the clutch member 87 and clutch disks carried thereby. At this time the axial shifting of the sleeve 82 exerts sufficient pressure on the collar 84 to engage the clutch disks of the clutch member 86 with the clutch disks of the clutch member 87, that is the friction clutch on the shaft 70 is engaged and the power from the motor 97 is transmitted to the shaft 70 to rock said shaft in the anticlockwise or chuck closing direction and to supplement the manual power applied thereto by the handle 77, the sleeve 73, and the sleeve 82.

It will be understood that when the member 80 engages the pin 110 its further movement in the anticlockwise direction is positively resisted, wherefore slippage then occurs in the friction operative connection between said member 80 and the hub 76 of the handle, but the member 80 remains in its rocked position and the switch 111 remains closed. The operator continues the anticlockwise movement of the handle 77 until the chuck is fully closed, at which time the plunger 117 has contacted the pin 121 and has been depressed against the action of the spring 119. The operator releases his grasp on the handle 77, whereupon the spring pressed plunger 117 moves the handle 77 slightly in the clockwise direction. This slight clockwise movement of the handle 77 and its hub 76 acts through the frictional driving connection between the hub and the member 80 to rock the latter slightly in the clockwise direction and until the pin 110 is located centrally of the recess 109, as shown in Fig. 12, at which time pressure on the actuating plunger 114 of the switch 111 is relieved and said switch is automatically opened, thus deenergizing the motor 97. This slight clockwise movement of the handle relieves the pressure on the sleeve 82 to disengage the disks of the friction clutch. It will be understood that the slight clockwise rotation of the handle just referred to is not sufficient to cause any opening of the chuck and is merely for the purpose of effecting the deenergization of the motor 97 and the disengagement of the friction clutch. The chuck now being closed and gripping the stock, the machining operation can be performed on the latter.

When the operator desires to open the chuck he manually rocks the lever 77 in a clockwise direction, with the result that the shaft 70 is rocked in a clockwise direction through the rotation of the sleeve 82 by the sleeve 73, effected through the interengagement of the clutch teeth 75 and 83. However, the initial portion of this clockwise movement of the handle 77 causes the member 80 to move in the clockwise direction until the pin 110 is in engagement with the left hand side of the recess 109 as viewed in Fig. 12, at which time the switch 112 is closed by the engagement of its actuating plunger 114 with the bottom of the recess of the member 80 that lies to the left of the recess 109. The closing of the switch 112 effects energization of the motor 97 for operation in the reverse or chuck opening direction and drives the gear 88 in the opposite direction from that in which it was previously driven as explained before. The clockwise rocking of the handle 77 not only rocks the sleeve 82 in a clockwise direction but shifts the same axially of the shaft due to the double acting cam surfaces on the clutch teeth 75 and 83, and such shifting of the sleeve 82 exerts pressure on the collar 84 and effects engagement of the clutch disks carried by the gear 87 and the clutch member 86, whereupon the power of the motor 97 is impressed upon the shaft 70 to supplement the manual power applied thereto in rocking the shaft in the clockwise direction.

The operator continues the clockwise movement of the handle 77 until the chuck is fully open, at which time the spring pressed plunger 116 has engaged the shoulder 120 and has been depressed against the action of the spring 119. Therefore, when the operator releases his grasp on the handle 77 the power of the spring 119 will act to rock the handle slightly in the anticlockwise direction and sufficiently far to move the member 80 to position the pin 110 midway of the recess 109 and cause the switch 112 to open automatically to effect deenergization of the motor 97. It will be understood that when the operator releases his grasp on the handle 77 and the latter rocks slightly in the anti-clockwise direction the springs 85 of the friction clutch on the shaft 70 act against the collar 84 to disengage the clutch disks.

From the foregoing description of the operation of the construction shown in Figs. 7 to 14 inclusive it will be seen that the manual power or torque applied to the shaft 70 in rocking the same in either direction is supplemented automatically by the power derived torque of the motor 97 and that said motor is energized and deenergized and its direction of operation reversed automatically in accordance with the manual movements of the handle 77. In other words, the operator manipulates the handle 77 in the usual way for manually operating the chuck actuating mechanism and without any attention on his part the power torque is impressed upon the shaft to supplement the manual torque applied thereto by the operator.

Although ordinarily greater torque is required to operate the chuck actuating mechanism in the chuck closing direction than in the chuck opening direction, the inertia and friction of the chuck parts and its actuating mechanism, particularly in large size machines, require considerable force in releasing or opening the chuck, particularly near the beginning of the chuck opening operation. Therefore, it is decidedly advantageous to provide the supplemental power for boosting the manual power applied to the mechanism in both the chuck opening operation and the chuck closing operation.

Should it be desired not to utilize the power of the motor 97 the operator may rock the handle 101 of the shaft 100 to cause the eccentric pin 103 to shift the sleeve 98 and disengage the clutch teeth 93 and 99. Such shifting of the sleeve 98 moves the V-notch 106 out of registry with the pin 107 and said pin is cammed upwardly until its upper end engages in the V-notch 108 of the member 80 and acts as a lock to hold said member 80 against rocking movement with the hub 76 of the handle 77, it being understood that the member 80, when so locked, is in the position where the pin 110 is midway of the recess 109 and both switches 111 and 112 are open. Consequently should the operator now rock the handle in either direction, no movement will be imparted to the member 80, which is positively held against movement by the pin 107, it being understood that slippage will occur in the friction connection between the hub 76 and the member 80. Consequently the handle can be rocked manually in either direction to rock the shaft 70 and effect the opening or closing of the chuck solely by manually applied force. It will be observed also that at this time the gear 88 is operatively disconnected from the motor 97, since the clutch teeth 93 and 99 are disengaged. Therefore, even though the friction clutch on the shaft 70 is engaged during the manual rocking of said shaft no motion will be transmitted back to the motor 97.

Although several embodiments of the invention have been illustrated and described herein, it should be understood that the invention is susceptible of various modifications and adaptations within the scope of the appended claims.

Having thus described my invention, I claim:

1. In a machine tool, a support, a member carried by said support and having a chuck, actuating mechanism for said chuck carried by said support and including a manually operable movable part for operating said mechanism manually and having a portion extending outwardly of said support, a housing secured to said support and through which said portion of said part extends, power means carried by said housing, a drive train interconnecting said power means and said part carried by said housing and including a clutch, and shiftable means for controlling said clutch and carried by said housing and engaging said clutch and actuated by the manual operation of said part.

2. In a machine tool, a support, a member carried by said support and having a chuck, actuating mechanism for said chuck carried by said support and including a rockable shaft and a manually operable means for rocking said shaft, a housing secured to and extending outwardly of said support and through which said shaft extends with said manually operable means located at the outer end of said housing, power means carried by said housing, a drive train interconnecting said shaft and said power means and carried by said housing and including a clutch, and shiftable clutch control means carried by said housing and operatively engaging said clutch and said manually operable means wherefore movement of said latter means to rock said shaft effects engagement of said clutch.

3. In a machine tool, a support, a member carried by said support and having a chuck, actuating mechanism for said chuck carried by said support and including a movable part extending outwardly of said support and a manually operated element for moving said part, a housing secured to said support and through which said part extends, a power means carried by said support, a drive train interconnecting said power means and said part and carried by said housing and including a clutch having spring means acting normally to disengage said clutch, and shiftable means engaging said clutch and said element and shifted by the manual movement of said element in one direction to engage said clutch against the action of said spring means.

4. A machine tool as defined in claim 3 and wherein means is provided for limiting the manual movement of said element in said one direction and which means also acts when the manual force is removed from said element to move the latter a sufficient distance in the opposite direction to allow said spring means to disengage said clutch and shift said shiftable means.

5. In a machine tool, a support, a member carried by said support and having a chuck, actuating mechanism for said chuck and carried by said support and including a rockable shaft extending outwardly of said support and manually operable means for rocking said shaft, a housing secured to said support and through which said shaft extends, a power means carried by said housing, a drive train interconnecting said shaft and power means and carried by said housing and including a clutch on said shaft, and a shiftable sleeve on said shaft for engaging said clutch and connected operatively with said manually operable means to be shifted thereby.

6. In a machine tool, a support, a member carried by said support and having a chuck, actuating mechanism for said chuck carried by said support and including a part movable in opposite directions for closing and opening said chuck and extending outwardly of said support and a manually operable element for moving said part, a housing secured to said support and through which said part extends, power means continuously operating during the operation of the machine tool and carried by said housing, a drive train interconnecting said power means and said part and carried by said housing and including a normally disengaged clutch, and shiftable means carried by said housing and contacting said clutch and said element and shiftable automatically upon manual operation of said element in a chuck closing direction to effect engagement of said clutch.

7. In a machine tool, a member having a chuck, actuating mechanism for said chuck including a part movable to close said chuck and an element connected with said part and manually operable in opposite directions to effect manual movement of said part, a power means the operation of which can be started and stopped, a drive train interconnecting said power means and said part and including a normally disengaged clutch, movable means contacting said clutch and said element and automatically moved to engage said clutch when said element is manually operated to close said chuck, and means for automatically controlling the starting and stopping of said power means when said element is manually operated to close said chuck and including control members actuated by said element and control connections between said control members and said power means.

8. In a machine tool, a member having a chuck, actuating mechanism for said chuck and including a rockable shaft and a manually operable handle mounted on said shaft for rocking the same, a power means, operative connections between said power means and shaft and including a clutch on said shaft, a sleeve splined on said shaft and operatively associated with said clutch for effecting engagement thereof when the sleeve is shifted in one direction and provided with teeth, and means operatively associated with said handle to rock therewith and provided with teeth cooperating with the sleeve teeth to shift said sleeve in said one direction.

9. In a machine tool, a member having a chuck, actuating mechanism for said chuck and including a rockable shaft and a manually operated handle for rocking said shaft, power means, operative connections between said shaft and said power means and including a clutch on said shaft having spring means acting to normally disengage said clutch, an axially shiftable sleeve splined on said shaft with one end contacting said clutch and its opposite end being provided with teeth, and means on said shaft and movable with said handle and provided with teeth cooperating with the teeth of said sleeve when said handle is manually moved in one direction to axially shift said sleeve and engage said clutch.

10. A machine tool as defined in claim 9 and wherein the teeth of said sleeve and said means on said shaft are provided with cooperating camming surfaces acting when said handle is manually moved in one direction to rotate said sleeve and axially shift the same to engage said clutch and with other cooperating surfaces effecting a positive driving relationship between said teeth when said handle is manually moved in the opposite direction.

11. In a machine tool, a member having a chuck, actuating mechanism for said chuck including a part movable in opposite directions to close and open said chuck and an element manually operable in opposite directions to effect said movements of said part, a power means the operation of which can be started, stopped, or reversed, operative connections between said power means and said part and including a normally disengaged clutch, means operatively associated with said clutch and said element for automatically engaging said clutch when said element is manually operated to close or open said chuck, and means operatively associated with said power means and said element for automatically controlling the starting and stopping and the direction of operation of said power means when said element is manually operated to close or open said chuck.

12. A machine tool as defined in claim 11 and wherein said power means is a reversible electric motor and said means which is operatively associated with said power means and said element includes a control circuit and switches for said motor.

13. In a machine tool, a member having a chuck; actuating mechanism for said chuck including a part movable in opposite directions to close and open said chuck and an element manually operable to effect said movements of said part; a reversible electric motor, operative connections between said motor and said part; and means for controlling the starting, the stopping and the direction of operation of said motor and including a control circuit having motor control switches therein, a movable switch operating member, and operative connections between said last member and said element.

14. In a machine tool, a member having a chuck, actuating mechanism for said chuck including a part movable in opposite directions to close and open said chuck and an element manually operable to effect said movements of said part; a reversible electric motor, operative connections between said motor and part; and means for controlling the starting, the stopping and the direction of operation of said motor and including a control circuit having motor control switches therein, a movable switch operating member, a friction driving connection between said switch operating member and said element, and means for positively limiting movement of said switch operating member within predetermined limits.

15. In a machine tool, a member having a chuck; actuating mechanism for said chuck including a part movable in opposite directions to close and open said chuck and an element manually operable to effect said movements of said part; a reversible electric motor, operative connections between said motor and part; means for controlling the starting, the stopping and the direction of operation of said motor and including a control circuit having motor control switches therein, a movable switch operating member, and operative connections between said last member and said element; and means for selectively rendering said switch operating member active or inactive whereby said chuck may be actuated either by a combination of manual force and power force or solely by manual force.

16. In a machine tool, a member having a chuck; actuating mechanism for said chuck including a shaft rockable in opposite directions to close and open said chuck and an element mounted on said shaft and manually operable to effect said rocking movements thereof; a reversible electric motor; operative connections between said motor and shaft and including a normally disengaged clutch mounted on said shaft; a sleeve splined on said shaft and movable in one direction to engage said clutch and provided with double acting cam teeth, a second sleeve mounted on said shaft and operatively associated with said element and provided with double acting cam teeth cooperating with the teeth of said first named sleeve whereby a predetermined movement of said element shifts said first sleeve to engage said clutch; means for controlling the starting, the stopping and the direction of operation of said motor and including a control circuit having motor control switches therein, a rockable switch operating member mounted on said second named sleeve, a friction driving connection between said switch operating member and said element, and means for positively limiting movement of said switch operating member within predetermined limits.

17. A machine tool as defined in claim 16 and wherein the operative connections between said motor and said shaft also include a positive clutch, means for selectively engaging and disengaging said positive clutch, and means actuated automatically by the disengagement of said positive clutch to render said switch operating member inactive.

18. A machine tool as defined in claim 16 and wherein means is provided for limiting the movement of said manually operable element in opposite directions and which means also acts when the manual force is removed from said element to move the latter in a reverse direction a sufficient distance to effect disengagement of said normally disengaged clutch and movement of said switch operating member to inactive position to stop said motor.

FRED H. BOGART.

REFERENCES CITED

The following references are of record in the file of this patent:

UNITED STATES PATENTS

| Number | Name | Date |
|---|---|---|
| 1,265,606 | Busch | May 7, 1918 |
| 1,785,349 | Hopkins | Dec. 19, 1930 |
| 1,926,478 | Erwin | Sept. 12, 1933 |
| 2,183,369 | Schurr | Dec. 12, 1939 |
| 2,311,010 | Vickers | Feb. 16, 1943 |